(12) United States Patent
Aldana Lopez et al.

(10) Patent No.: US 10,372,134 B2
(45) Date of Patent: Aug. 6, 2019

(54) METHODS AND APPARATUS TO IMPLEMENT NONLINEAR CONTROL OF VEHICLES MOVED USING MULTIPLE MOTORS

(71) Applicant: Intel Corporation, Santa Clara, CA (US)

(72) Inventors: Rodrigo Aldana Lopez, Zapopan (MX); Jose I. Parra Vilchis, Guadalajara (MX); Rafael De La Guardia Gonzalez, Teuchitlan (MX); David Gomez Gutierrez, Tlaquepaque (MX)

(73) Assignee: INTEL CORPORATION, Santa Clara, CA (US)

( * ) Notice: Subject to any disclaimer, the term of this patent is extended or adjusted under 35 U.S.C. 154(b) by 209 days.

(21) Appl. No.: 15/639,586

(22) Filed: Jun. 30, 2017

(65) Prior Publication Data

US 2019/0004519 A1 Jan. 3, 2019

(51) Int. Cl.
*G05D 1/00* (2006.01)
*G05D 1/02* (2006.01)
*G05D 1/08* (2006.01)
*B64C 39/02* (2006.01)

(52) U.S. Cl.
CPC ............ *G05D 1/02* (2013.01); *B64C 39/024* (2013.01); *G05D 1/021* (2013.01); *G05D 1/0202* (2013.01); *G05D 1/0808* (2013.01); *G05D 1/0891* (2013.01); *B64C 2201/108* (2013.01); *B64C 2201/141* (2013.01); *B64C 2201/146* (2013.01); *G05D 1/0088* (2013.01)

(58) Field of Classification Search
CPC ...... G05D 1/02; G05D 1/0202; G05D 1/0891; G05D 1/0808; G05D 1/021; G05D 1/0088; B64C 39/024; B64C 2201/108; B64C 2201/146; B64C 2201/141
See application file for complete search history.

(56) References Cited

U.S. PATENT DOCUMENTS

| 8,135,528 | B2* | 3/2012 | Takenaka | B60T 8/17552 701/42 |
| 8,473,119 | B2* | 6/2013 | Larkin | G05D 1/0858 244/4 R |
| 9,216,745 | B2* | 12/2015 | Beardsley | B60W 50/10 |
| 9,979,463 | B1* | 5/2018 | Shafer | H04B 7/18504 |
| 2010/0131135 | A1* | 5/2010 | Jaensch | G05B 17/02 701/22 |

* cited by examiner

*Primary Examiner* — Russell Frejd
(74) *Attorney, Agent, or Firm* — Hanley, Flight & Zimmerman, LLC

(57) ABSTRACT

Methods and apparatus to implement nonlinear control of vehicles moved using multiple motors, apparatus, systems and articles of manufacture are disclosed. An example apparatus includes a logic circuit configured to calculate virtual position control variables for a vehicle moved using multiple motors. The virtual position control variables calculated based on an application of a control law to position information of the vehicle. The control law is derived from a nonlinear model of movement of the vehicle. The logic circuit is configured further to calculate control inputs based on the virtual position control variables. The control inputs are to control the motors to navigate the vehicle along a designated path of movement.

22 Claims, 9 Drawing Sheets

METHODS AND APPARATUS TO IMPLEMENT NONLINEAR CONTROL OF VEHICLES MOVED USING MULTIPLE MOTORS

FIELD OF THE DISCLOSURE

This disclosure relates generally to autonomously controlled vehicles, and, more particularly, to methods and apparatus to implement nonlinear control of vehicles moved using multiple motors.

BACKGROUND

Some vehicles, such as drones (or unmanned aerial vehicles (UAVs)) and rovers, are typically moved using multiple motors driving different propellers (on UAVs) or wheel assemblies (on rovers). Such vehicles may be remotely controlled by an operator or fully autonomous. Vehicles operated fully or partially autonomously often implement control algorithms that involve iterative computations based on model-based systems. Many factors including, for example, computation time, real-time performance, isolation from system interruptions, and so forth, can impact the ability and/or robustness of such autonomous control systems to reduce the likelihood of errors, particularly at times where a vehicle may be subject to significant external disturbances.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
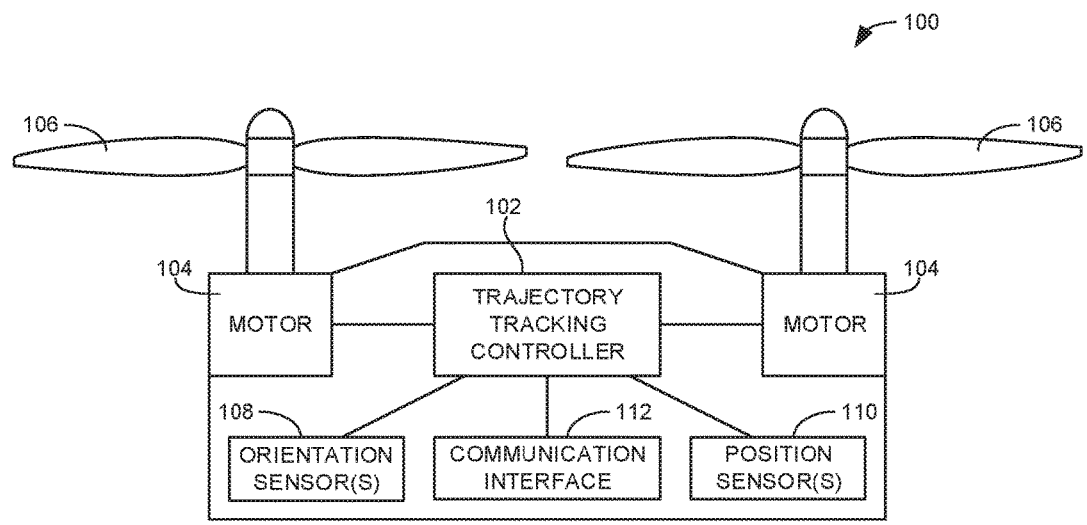
FIG. 1 is a schematic illustrating an example UAV constructed in accordance with the teachings disclosed herein.

For purposes of explanation, examples disclosed herein are described with respect to unmanned aerial vehicles (UAVs). However, the teachings disclosed herein may be suitably adapted to other types of vehicles (e.g., rovers) or other machines (e.g., robots) that may be autonomously moved using multiple motors.

Control algorithms, which enable autonomous control of UAVs, are typically based in iterative computations associated with modelled systems for the UAVs. The ability of such algorithms to properly control a UAV (e.g., to avoid crashing or other malfunctioning) depends on the computation time of the system implementing the algorithms, the real-time online performance of the system, and the isolation of the system from interruptions, among other factors.

UAVs are often designed using different processors for controllers and algorithms. The end result is a system in which advanced controllers are limited due to the amount of computation required in a relatively low-frequency processor implementing the algorithms. Robust controllers, which offer better performance when parameter uncertainty exists in the model underlying the algorithm, require higher computation and actuation frequency than is available with currently known general-purpose processors. Such needs arise in certain UAV applications such as, for example, trajectory tracking and/or accurate responses to real-time external disturbances (e.g., wind gusts, other moving objects in a flight path of the UAV, etc.). Examples disclosed herein describe methods and apparatus that enable advanced controllers to execute at relatively high-frequencies, in substantially real-time, and with relatively high accuracy to enable reliable and robust control of a UAV. More particularly, the teachings disclosed herein describe a configurable controller hardware accelerator for a UAV that may be executed independent of a general-purpose processor. The accelerator is configurable in that it is based on a generic model of the translational and rotational dynamics of multi-motor UAVs. As a result, examples disclosed herein may be applied to many different types of UAVs unlike other control systems that are often vehicle specific.

While a hardware accelerator operating independent of and/or in parallel with a general-purpose processor can achieve significantly higher frequencies than the general-purpose processor, the performance of the examples disclosed herein is further enhanced (e.g., optimized) based on particular scheduling of computations in connection with a pipeline architecture for the hardware. In some examples, the teachings disclosed herein may be implemented within a dedicated system on a chip (SoC) that may be instantiated as a peripheral module that runs in parallel and in real-time. Further still, the example control system may be isolated from a general processor handling other aspects of the UAV, thereby avoiding external interruptions that may cause erratic and/or otherwise problematic behavior in the UAV when autonomously controlled.

FIG. 1 is a schematic illustrating an example UAV 100 constructed in accordance with the teachings disclosed herein. The example UAV 100 includes a trajectory tracking controller 102 capable of autonomously controlling movement of the UAV 100. That is, as shown in the illustrated example, the trajectory tracking controller 102 generates control inputs provided to multiple motors 104 that are used to move the UAV 100 (e.g., by driving propellers 106). In the illustrated example, the UAV 100 is provided with one or more orientation sensor(s) 108 to provide information indicative of the attitude or orientation of the UAV 100 to the example trajectory tracking controller 102. In some examples, the orientation sensor(s) 108 include accelerometers, gyroscopes, magnetic field sensors, etc. that are associated with an inertial measurement unit (IMU).

The example UAV 100 is provided with one or more position sensor(s) 110 to provide information indicative of the position or location of the UAV 100. The position sensor(s) 110 may include image sensors, a global position system (GPS), etc. The example UAV 100 is provided with a communication interface 112 to enable communications with a remote operator. In some examples, control provided by the trajectory tracking controller 102 is partially autonomous in that control is accomplished based on inputs from a remote operator as well as substantially real-time feedback from the orientation sensor(s) 108 and the position sensor(s) 110. For example, the trajectory tracking controller 102 may provide attitude control while a remote operator controls translational movement of the UAV 100. Attitude control refers to the control or stabilization of the orientation of the UAV 100.

In some examples, control provided by the trajectory tracking controller 102 is fully autonomous based on input data generated via the orientation sensor(s) 108 and the position sensor(s) 110. That is, in some examples, the trajectory tracking controller 102 is sufficient to provide autonomous attitude control as well as trajectory tracking. Trajectory tracking refers to the control of the movement of the UAV 100 within three-dimensional space to follow a designated flightpath and/or arrive at a designated destination. In some such examples, the communication interface 112 is provided to enable an operator to initially define the flightpath and/or destination and/or to otherwise configure or control parameters used in the control algorithms for trajectory tracking once the UAV 100 takes flight.

Trajectory tracking is a much more computationally burdensome task than what is needed for attitude control. The difficulty of accurate trajectory tracking is exacerbated when the UAV 100 may be subject to significant external disturbances such as, for example, winds gusts in an outdoor environment and/or when the UAV 100 must navigate relative to other moving objects. As mentioned above, providing accurate trajectory tracking in these circumstances typically involves computational speeds that are faster than what is possible with currently available general-purpose processors. Accordingly, in some examples, the trajectory tracking controller 102 is implemented using hardware (e.g., a hardware accelerator) that operates independent and/or in parallel with a typical microcontroller or processor that handles other functionality of the UAV 100. Not only does this approach allow for faster computations, the independent implementation of the example trajectory tracking controller 102 from a separate processor avoids potential interruptions in the control calculations (e.g., that may arise if implemented by the main processor). Therefore, examples disclosed herein provide a more robust control system for the UAV 100 that is capable of accurately tracking a trajectory and responding to external disturbances in substantially real-time. Furthermore, as described more fully below, the calculations implemented by the trajectory tracking controller 102 are scheduled in a particular order to take advantage of the pipelined architecture of the trajectory tracking controller 102, thereby further improving the speed and, thus, the accuracy of the controller.

Figure 2:
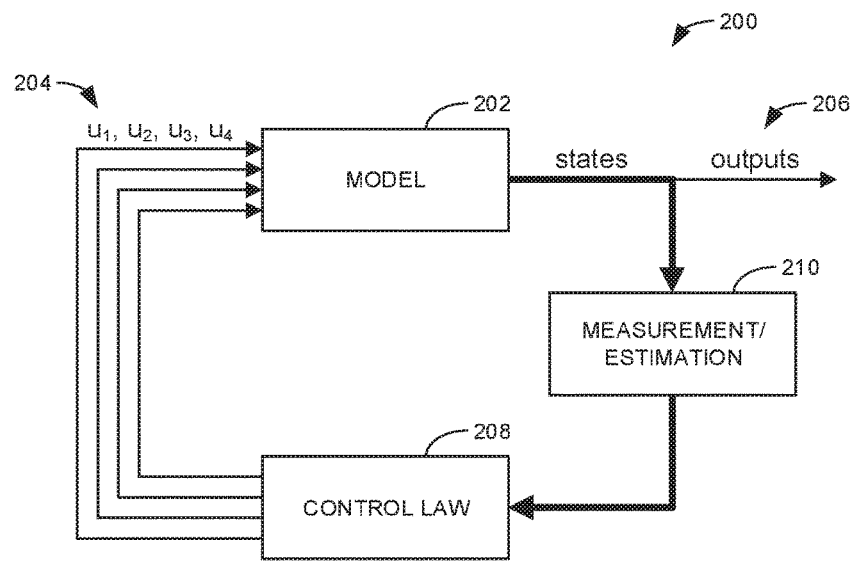
FIG. 2 is a schematic illustrating an example control system that may be used to autonomously control the UAV of FIG. 1.

FIG. 2 is a schematic illustrating an example control system 200 that may be used to autonomously control the UAV 100 of FIG. 1. As shown in the illustrated example, the control system 200 is based on a mathematical model 202 defining movement of the UAV. The model 202 may include multiple controllable variables that may be defined by control inputs 204 that enable the control of the UAV 100, such as, for example, motor torques or a combination of associated inputs that control the motors 104 of the UAV 100. In the illustrated example, there are four control inputs 204 corresponding to four motors of a quadcopter (e.g., a four-motor UAV). Different systems corresponding to different types of UAVs may include different types and/or different numbers of control inputs 204.

Based on the values of the control inputs 204, the model produces corresponding outputs 206 used to control the UAV 100 by, for example, adjusting the torque and/or associated speed (e.g., angular velocity) of the UAV motors 104. More particularly, in some examples, the angular velocities of the motors 104 of the UAV 100 are controlled using pulse-width modulated (PWM) signals. In such examples, the PWM outputs of the control system 200 are calculated based on the control inputs 204. Any adjustments to the outputs, as well as external disturbances, may affect the states (position, speed, acceleration, orientation, angular rotation, etc.) of the UAV 100, thereby giving rise to the need to adjust the control inputs 204. As shown in the illustrated example, a control law 208 is used to calculate the control inputs 204 to stabilize and/or change the behavior (e.g., movement) of the UAV 100. The control law 208 corresponds to mathematical expressions or relationships for the control variables in the model 202 that are derived as a function of the UAV states. Thus, as the states of the UAV 100 are measured and/or estimated (block 210), the control law 208 is used to generate updated control inputs 204 that may be iteratively analyzed in accordance with the model 202 to continuously update the outputs 206 and resulting states of the UAV 100.

The iterative feedback process represented in FIG. 2 is typically designed with a time step that imposes frequency constraints for the output signals. While the particular time step depends on the method used to derive the control algorithm, as a general matter, greater accuracy for control of the UAV 100 can be achieved as the time step decreases. For this reason, in some examples, the trajectory tracking controller 102 of FIG. 1 is implemented as a hardware accelerator with a particular pipeline architecture to achieve increased performance speeds and, thus, greater accuracy and robustness in control.

While FIG. 2 is a general schematic, the model 202 used in the examples disclosed herein is specific to a multi-rotor UAV (or other devices (e.g., rovers, robots) that move using multiple motors). More particularly, the particular model 202 in the examples described below is a twelve-dimensional mathematical model that includes six equations defining the dynamic of translational motion associated with position and associated translational movement (represented by Equations 1-6) and six equations defining the dynamic of rotational motion associated with orientation and associated rotational movement (represented by Equations 7-12) as follows:

$$\dot{x} = v_x \qquad \text{Eq. 1}$$

$$\dot{y} = v_y \qquad \text{Eq. 2}$$

$$\dot{z} = v_z \qquad \text{Eq. 3}$$

$$\dot{v}_x = -\frac{1}{m}(\cos(\phi)\cos(\psi)\sin(\theta) + \cos(\phi)\cos(\psi))c_T u_1 \qquad \text{Eq. 4}$$

$$\dot{v}_y = -\frac{1}{m}(\cos(\phi)\cos(\theta)\sin(\psi) - \cos(\psi)\sin(\phi))c_T u_1 \qquad \text{Eq. 5}$$

-continued $$\dot{v}_z = g - \frac{1}{m}(\cos(\phi)\cos(\theta))c_T u_1 \quad \text{Eq. 6}$$

$$\dot{\psi} = \frac{\sin(\phi)}{\cos(\theta)}\omega_y + \frac{\cos(\phi)}{\cos(\theta)}\omega_z \quad \text{Eq. 7}$$

$$\dot{\theta} = \cos(\phi)\omega_y - \sin(\theta)\omega_z \quad \text{Eq. 8}$$

$$\dot{\phi} = \omega_x + \frac{\sin(\theta)}{\cos(\theta)}\sin(\phi)\,\omega_y + \frac{\sin(\theta)}{\cos(\theta)}\cos(\phi)\omega_z \quad \text{Eq. 9}$$

$$\dot{\omega}_x = \frac{I_y - I_z}{I_x}\omega_y\omega_z + \frac{dc_T}{I_x}u_2 \quad \text{Eq. 10}$$

$$\dot{\omega}_y = \frac{I_z - I_x}{I_y}\omega_z\omega_x + \frac{dc_T}{I_y}u_3 \quad \text{Eq. 11}$$

$$\dot{\omega}_z = \frac{I_x - I_y}{I_z}\omega_y\omega_x + \frac{c_Q}{I_z}u_4 \quad \text{Eq. 12}$$

where x, y, and z refer to the translational position of the UAV 100 on the different axes in three-dimensional space; $v_x$, $v_y$, and $v_z$ refer to the translational velocities along the respective axes; $\psi$, $\theta$, and $\phi$ (yaw, pitch, and roll, respectively) are the Euler angles representing orientation of the UAV 100, $\omega_x$, $\omega_y$, and $\omega_z$ are the angular velocities, $I_x$, $I_y$, and $I_z$ refer to the moments of inertia, m is the mass of the UAV 100, $c_T$ is the thrust coefficient for the propellers 106, $c_Q$ is the drag coefficient for the propellers 106, d is the distance from the center of mass of the UAV 100 to the propellers 106, and g is gravitational acceleration. The variables $u_1$, $u_2$, $u_3$, and $u_4$ in the above equations are the control inputs 204 for the UAV 100 that are related to pulse-width modulated (PWM) inputs for each of the four motors 104 of the UAV 100 according to the following system:

$$\begin{bmatrix} u_1 \\ u_2 \\ u_3 \\ u_4 \end{bmatrix} = \begin{bmatrix} 1 & 1 & 1 & 1 \\ 0 & -1 & 0 & 1 \\ -1 & 0 & 1 & 0 \\ 1 & -1 & -1 & -1 \end{bmatrix} \begin{bmatrix} PWM_1^2 \\ PWM_2^2 \\ PWM_3^2 \\ PWM_4^2 \end{bmatrix} \quad \text{Eq. 13}$$

In Equation 13, the first control input (i.e., $u_1$) is referred to herein as the translational control input because it is calculated based on information associated with the translational position of the UAV 100. The remaining three control inputs (i.e., $u_2$, $u_3$, $u_4$) of Equation 13 are referred to herein as the orientation control inputs because they are calculated based on information indicative of the orientation of the UAV 100. With calculated values for the control inputs 204 and using the relationships defined in Equation 13, the PWM input for each motor 104 may be calculated to accurately control the movement of the UAV 100.

As mentioned above, the model represented by Equations 1-12 is for devices driven by multiple motors. However, Equation 13 is specific to a UAV with four separate motors (e.g., a quadcopter). Thus, Equation 13 includes four individual PWM inputs ($PWM_1$, $PWM_2$, $PWM_3$, and $PWM_4$), each corresponding to a different motor 104 of the UAV 100. Although the relationships indicated in Equation 13 are for a four-motor UAV, the system of Equation 13 may be adapted to a UAV with any suitable number of motors. Aside from this change, the mathematical model represented by equations 1-12 is generic such that the model may be configured and/or easily adapted to a wide variety of UAVs without changing the controller structure. In other words, the example control systems described herein may be configured for use with many particular UAVs rather than by developing a complete control system unique to a particular UAV as is common with many UAV control systems known in the art. This is possible so long as the physical parameters for the UAV are known either through estimation or by characterizing the system.

Many existing controllers for UAVs are implemented using PID (proportional-integral-derivative) controllers. However, PID controllers implement feedback control based on constant parameters without accounting for or incorporating direct knowledge of the system being controlled in real-time. Furthermore, PID controllers assume that the system being controlled is linear. While such controllers may be sufficient for attitude control of UAVs (e.g., controlling orientation of a UAV while a remote operator controls movement), they are generally insufficient to enable robust tracking of a trajectory needed for increased autonomous control (e.g., fully autonomous control). Unlike traditional PID controllers, examples disclosed herein implement a nonlinear controller that takes into account a model of a UAV based on Equations 1-12 outlined above.

More particularly, examples disclosed herein are based on a non-interactive control with a super-twisting translational control law (e.g., the control law 208) derived from the system model. The continuous form of the control law 208 is represented as follows:

$$u_A(t) = k_1 \lfloor e(t) \rceil^{\alpha_1} + k_2 \lfloor \dot{e}(t) \rceil^{\alpha_2} + \quad \text{Eq. 14}$$
$$k_3 \ddot{A}_{ref}(t) + \int_0^t (k_4 \lfloor e(\tau) \rceil^{\alpha_3} + k_5 \lfloor \dot{e}(\tau) \rceil^{\alpha_4}) d\tau$$

wherein $$\lfloor \bullet \rceil^\alpha = \begin{cases} |\bullet|^\alpha \operatorname{sign}(\bullet) & \text{if } \alpha \neq 0 \\ \operatorname{sign}(\bullet) & \text{if } a = 0 \end{cases} \quad \text{Eq. 15}$$
$$0 \leq \alpha \leq 1$$

where A is a generic placeholder that may corresponding to a particular parameter defined in the UAV model 202 (e.g., x, y, z, $\psi$, $\theta$, $\phi$); $u_A(t)$ is the control input variable associated with the particular parameter A at time t; e is the error or difference between a measured value of the parameter and a reference or target value for the parameter (e.g., $e=A-A_{ref}$); $k_1$, $k_2$, $k_3$, $k_4$, and $k_5$ are gains defined for the system; and $\alpha_1$, $\alpha_2$, $\alpha_3$, and $\alpha_4$ are the nonlinear power constants. Equation 14 is a nonlinear generalization of a PID controller that may be reduced to a traditional linear PID controller by setting $\alpha_1=\alpha_2=\alpha_3=\alpha_4=1$ and $k_3=k_5=0$.

While Equation 14 represents the continuous (e.g., theoretical) version of the control law 208 for the UAV 100, the control law may be discretized for implementation in the examples disclosed herein. The discrete form of the control law is represented mathematically as follows:

$$u_A[n] = \ddot{A}_{ref}[n] + k_1 |A[n] - A_{ref}[n]|^{1/3} \operatorname{sign}(A[n] - A_{ref}[n]) + \\ k_2 |\dot{A}[n] - \dot{A}_{ref}[n]|^{1/2} \operatorname{sign}(\dot{A}[n] - \dot{A}_{ref}[n]) - B[n] + v[n] \quad \text{Eq. 16}$$

$$v[n+1] = v[n] + T(k_4 \operatorname{sign}(A[n] - A_{ref}[n])) + T(k_5 \operatorname{sign}(\dot{A}[n] - \dot{A}_{ref}[n])) \quad \text{Eq. 17}$$

where $u_A[n]$ (Eq. 16) is the control variable associated with the nth calculation of a particular parameter A and $v[n+1]$ (Eq. 17) is a discrete implementation (e.g., an accumulator) of the integral of Equation 14. B[n] in Equation 16 is a placeholder variable that is set based on the particular parameter A being analyzed. More particularly, B[n]=0 for the x, y, $\psi$, $\theta$, and $\phi$ parameters and B[n]=g (i.e., gravitational acceleration) for the z parameter such that the associated control input, $u_z$, will have an offset of gravity. Thus, B[n] is included in Equation 16 to make the control law generic to all six parameters. In Equation 17, T corresponds to the interval or time step of the discretization of time (i.e., the inverse rate at which the control system is running).

In some examples, as is revealed by a comparison of Equations 16 and 17 with Equation 14, some of the values for the gains and power constants are fixed to specific values. In particular, $k_3$ (shown in Equation 14) is assumed to be 1 and, thus, not shown in Equation 16. Furthermore, the values for the power constants are set such that $\alpha_1=\frac{1}{3}$, $\alpha_2=\frac{1}{2}$, and $\alpha_3=\alpha_4=0$. The values set for these parameters have been determined based on testing. Of course, in other examples, the values for these parameters may be configured to other suitable values to define the control law 208 used to define the control inputs 204 for the model 202.

Figure 3:
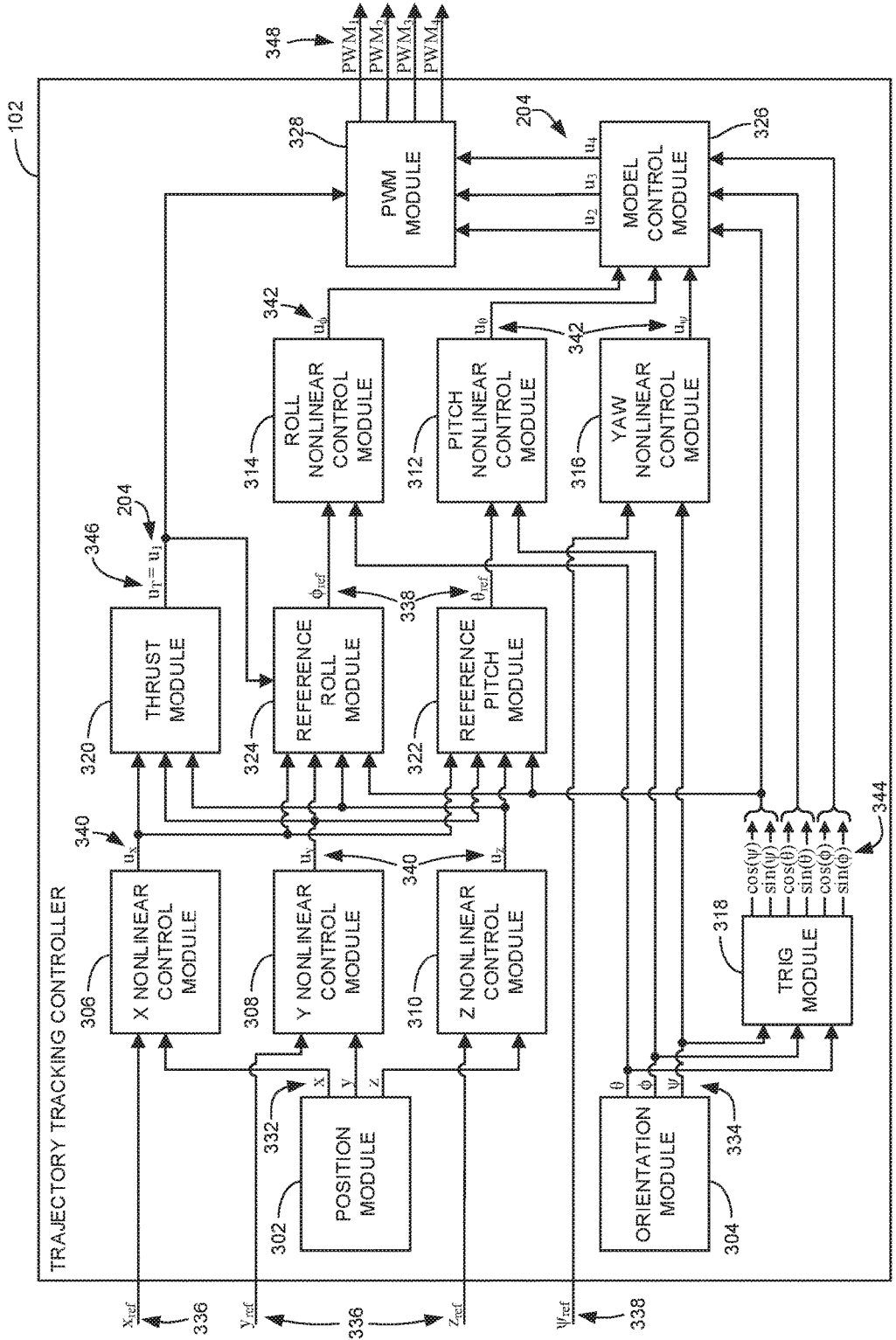
FIG. 3 is a block diagram illustrating an example implementation of the example trajectory tracking controller 102 of FIG. 1 based on the control system of FIG. 2.

FIG. 3 is a block diagram illustrating an example implementation of the trajectory tracking controller 102 of FIG. 1. The example trajectory tracking controller 102 includes an example position module 302, an example orientation module 304, an example X nonlinear control module 306, an example Y nonlinear control module 308, an example Z nonlinear control module 310, an example pitch nonlinear control module 312, an example roll nonlinear control module 314, an example yaw nonlinear control module 316, an example trig module 318, an example thrust module 320, an example reference pitch module 322, an example reference roll module 324, an example model control module 326, and an example PWM module 328.

In the illustrated example of FIG. 3, the trajectory tracking controller 102 is provided with the example position module 302 to obtain and/or provide measured position information 332 indicative of the measured position or location of the UAV 100 within three-dimensional space. In particular, the measured position information 332 includes an X position, a Y position, and a Z position. In some examples, the measured position information 332 is obtained using any suitable localization method in connection with data received from the position sensor(s) 110 of FIG. 1. In some examples, the position module 302 obtains and updates the measured position information 332 at a frequency greater than or equal to approximately 10 Hz.

In the illustrated example of FIG. 3, the trajectory tracking controller 102 is provided with the example orientation module 304 to obtain and/or provide measured orientation information 334 indicative of the orientation or attitude of the UAV 100. In particular, the measured orientation information 334 includes a measured pitch ($\theta$) orientation, a measured roll ($\phi$) orientation, and a measured yaw ($\psi$) orientation of the UAV 100. In some examples, the measured orientation information 334 is obtained using any suitable IMU filtering algorithm in connection with data received from the orientation sensor(s) 108 of FIG. 1. In some examples, the orientation module 304 obtains and updates the measured orientation information 334 at a frequency greater than or equal to approximately 250 Hz.

In FIG. 3, the example X nonlinear control module 306, the example Y nonlinear control module 308, the example Z nonlinear control module 310, the example pitch nonlinear control module 312, the example roll nonlinear control module 314, and the example yaw nonlinear control module 316 implement the same functionality with the main difference being that each of the nonlinear control modules 306, 308, 310, 312, 314, 316 is associated with a different parameter (e.g., x, y, z, $\theta$, $\phi$, $\psi$) defining the position and orientation of the UAV 100. Thus, as shown in the illustrated example, each nonlinear control module 306, 308, 310, 312, 314, 316 receives as inputs, a reference input parameter and a measured input parameter to generate a corresponding control variable output. That is, the X nonlinear control module 306 receives a reference X position ($X_{ref}$) and a measured X position (e.g., the x output from the position module 302), the example Y nonlinear control module 308 receives a reference Y position ($Y_{ref}$) and a measured Y position (e.g., the y output from the position module 302), the example Z nonlinear control module 310 receives a reference Z position ($Z_{ref}$) and a measured Z position (e.g., the z output from the position module 302), the example pitch nonlinear control module 312 receives a reference pitch orientation ($\theta_{ref}$) and a measured pitch orientation (e.g., the $\theta$ output from the orientation module 304), the example roll nonlinear control module 314 receives a reference roll orientation ($\phi_{ref}$) and a measured roll orientation (e.g., the $\phi$ output from the orientation module 304), and the example yaw nonlinear control module 316 receives a reference yaw orientation ($\psi_{ref}$) and a measured yaw orientation (e.g., the $\psi$ output from the orientation module 304).

The measured X, Y, and Z positions (e.g., x, y, and z in FIG. 3) correspond to the measured position information 332 that, as mentioned above, is indicative of the actual or measured position of the UAV 100. The reference X, Y, and Z positions (e.g., $X_{ref}$, $Y_{ref}$, and $Z_{ref}$ in FIG. 3) are collectively referred to herein as reference position information 336 and correspond to a desired or target position of the UAV 100. The reference position information 336 is defined by the desired path of movement (e.g., flightpath or trajectory) designated for the UAV 100. As such, in the illustrated example, the reference position information 336 is indicated as inputs to the trajectory tracking controller 102. In some examples, the reference position information 336 is fixed based on a precomputed choreography for the UAV 100. In some examples, the reference position information 336 may be adjusted during flight by a trajectory planning algorithm separately implemented on the UAV 100.

The measured pitch, roll, and yaw orientations (e.g., the $\theta$, $\phi$, and $\psi$ in FIG. 3) correspond to measured orientation information 334 that, as mentioned above, is indicative of the actual or measured orientation of the UAV 100. The reference pitch, roll, and yaw orientation (e.g., the $\theta_{ref}$, $\phi_{ref}$, and $\psi_{ref}$ in FIG. 3) are collectively referred to herein as reference orientation information 338 and correspond to a desired or target orientation of the UAV 100. In the illustrated example, similar to the reference position information 336, the reference yaw orientation ($\psi_{ref}$) is shown as an input to the trajectory tracking controller 102 because the reference yaw orientation may be determined directly from the desired flightpath or trajectory designated for the UAV 100. Unlike the reference yaw orientation (and the reference position information 332), the reference pitch orientation ($\theta_{ref}$) and the reference roll orientation ($\phi_{ref}$) are not directly known or measured. However, the value for these parameters may be calculated based on information that is known. More particularly, as described more fully below, the reference pitch orientation is calculated by the reference pitch module 322 and the reference roll orientation is calculated by the reference roll module 324 based on outputs of the position-based nonlinear control modules 306, 308, 310.

Based on the reference and measured parameters input to each corresponding nonlinear control module 306, 308, 310, 312, 314, 316, a corresponding virtual control variable 340, 342 (e.g., $u_x$, $u_y$, $u_z$) is generated. In the illustrated example, the position-based nonlinear control modules 306, 308, 310 receive respective measured position information 332 and reference position information 336 to generate corresponding virtual position control variables 340 (e.g., $u_x$, $u_y$, $u_z$). Likewise, the orientation-based nonlinear control modules 312, 314, 316 receive respective measured orientation information 334 and reference orientation information 338 to generate corresponding virtual orientation control variables 342 (e.g., $u_\theta$, $u_\phi$, $u_\psi$). The virtual position and orientation control variables 340, 342 are collectively referred to herein as virtual control variables. The virtual control variables 340, 342 are referred to herein as "virtual" because they are generated based on the control law 208 derived from the model 202, which, in this example, is expressed by Equations 1-12 outlined above. It is from these virtual control variables 340, 342 that final or actual control variables corresponding to the control inputs 204 of FIG. 2 and expressed in relationship to the PWM inputs in Equation 13 are subsequently calculated to control the UAV 100.

Figure 4:
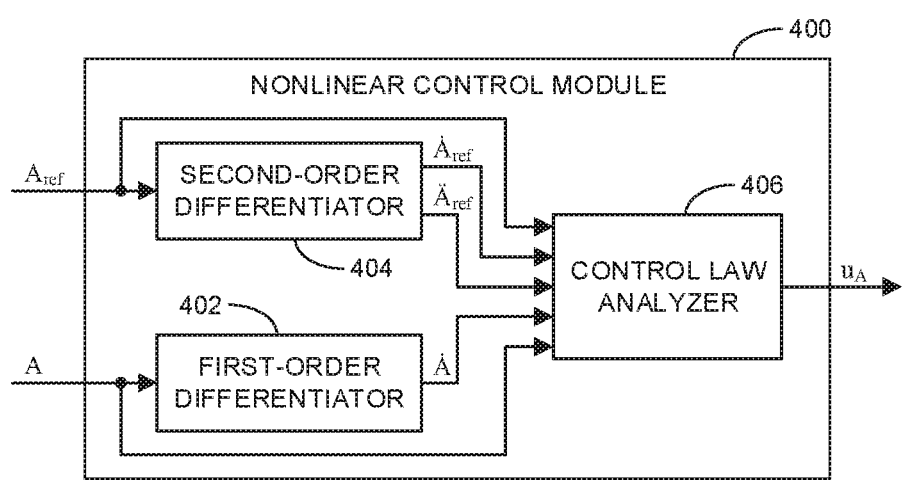
FIG. 4 is a block diagram illustrating an example implementation of a generic nonlinear control module 400 that may correspond to any one of the nonlinear control modules of FIG. 3.

Further detail regarding the implementation of the nonlinear control modules 306, 308, 310, 312, 314, 316 to calculate the virtual control variables 340, 342 is shown in FIG. 4. In particular, FIG. 4 is a block diagram illustrating an example implementation of a nonlinear control module 400 that may correspond to any one of the nonlinear control modules 306, 308, 310, 312, 314, 316 of FIG. 3. In the illustrated example of FIG. 4, the letter "A" represents a generic parameter corresponding to any one of the parameters of the model 202 for the UAV 100 (e.g., x, y, z, $\theta$, $\phi$, $\psi$). Thus, "$A_{ref}$" corresponds to the reference parameter to be analyzed (e.g., $X_{ref}$ with respect to the X nonlinear control module 306), "A" corresponds to the corresponding measured parameter to be analyzed (e.g., x with respect to the X nonlinear control module 306), and "$u_A$" corresponds to the resulting virtual control variable 340, 342 (e.g., $u_x$ with respect to the X nonlinear control module 306).

As shown in the illustrated example of FIG. 4, the generic nonlinear control module 400 includes an example first-order differentiator 402, an example second-order differentiator 404, and an example control law analyzer 406. As shown in the illustrated example, the first-order differentiator 402 calculates a first derivative of the input measured parameter (A). In some examples, the first-order differentiator 402 calculates the first derivative based on a hardware implementation of the following equations:

$$z_1[n+1]=z_1[n]+(j_1|f[n]-z_1[n]|^{1/2} \operatorname{sign}(f[n]-z_1[n])+z_2[n])T \quad \text{Eq. 18}$$

$$z_2[n+1]=z_2[n]+(j_2 \operatorname{sign}(f[n]-z_1[n]))T \quad \text{Eq. 19}$$

where f[n] is the function to be differentiated (e.g., the input measured parameter A), $z_1$ is the filtered function, $z_2$ is the filtered first derivative, T is the sampling time, and $j_1$ and $j_2$ are configurable gains.

In some examples, the second-order differentiator 404 calculates both the first and second derivatives of the input reference parameter ($A_{ref}$) based on a hardware implementation of the following equations:

$$z_1[n+1]=z_1[n]+(j_1|f[n]-z_1[n]|^{1/2} \operatorname{sign}(f[n]-z_1[n])+z_2[n])T \quad \text{Eq. 20}$$

$$z_2[n+1]=z_2[n]+(j_2|f[n]-z_1[n]|^{1/3} \operatorname{sign}(f[n]-z_1[n])+z_3[n])T \quad \text{Eq. 21}$$

$$z_3[n+1]=z_3[n]+(j_3 \operatorname{sign}(f[n]-z_1[n]))T \quad \text{Eq. 22}$$

where f[n] is the function to be differentiated (e.g., the input reference parameter $A_{ref}$), $z_1$ is the filtered function, $z_2$ is the filtered first derivative, $z_3$ is the filtered second derivative, T is the sampling time, and $j_1$, $j_2$, and $j_3$ are configurable gains.

Figure 5:
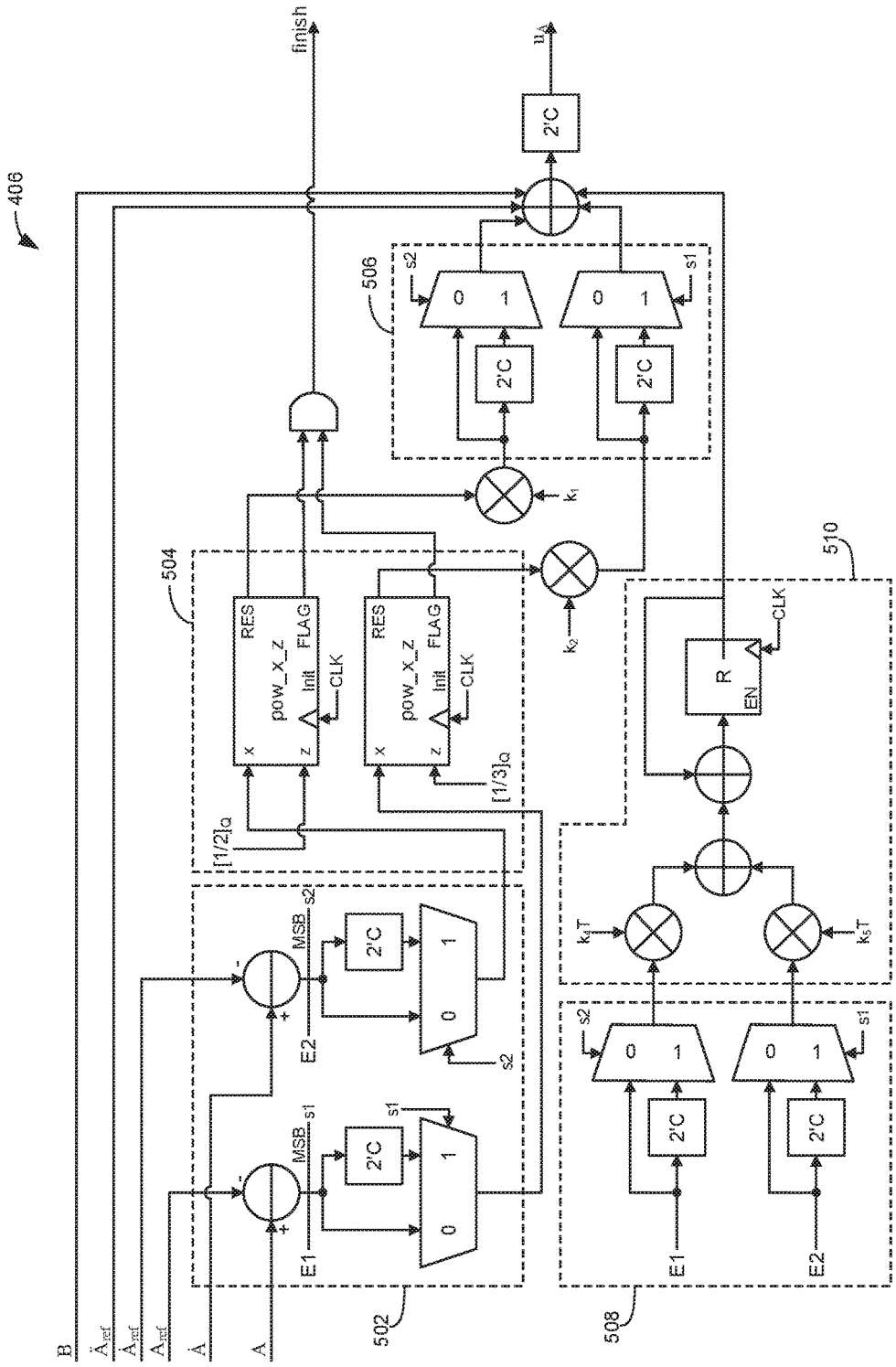
FIG. 5 is a schematic diagram of an example hardware architecture to implement the example control law analyzer of FIG. 4.

In the illustrated example of FIG. 4, the measured parameter (A), the reference parameter ($A_{ref}$), and their derivatives are provided as inputs to example control law analyzer 406. The control law analyzer 406 implements the control law 208 of FIG. 2 represented by Equations 16 and 17 outlined above. In some examples, the control law analyzer 406 is implemented via hardware. In particular, FIG. 5 is a schematic diagram of a hardware architecture for the example control law analyzer 406 of FIG. 4 that implements Equations 16 and 17. In the illustrated examples, each of the measured and reference parameters and their derivatives are represented by a separate input line. However, in some examples, each of the reference parameter ($A_{ref}$), and the first and second derivatives of the reference parameter are provided via a single input line. Whether the value for the non-differentiated parameter, the first derivative, or the second derivative is provided as an input at any particular time in such examples depends upon the scheduling of the output from the second-order differentiator 404 of FIG. 4. Likewise, the measured parameter (A) and its first derivative may be input via a single input line based on the schedule.

As shown in the illustrated example of FIG. 5, the hardware implementation includes an absolute value calculator 502 to calculate the absolute values of the differences between the measured and reference parameters and their derivatives. The example hardware implementation of FIG. 5 includes a power calculator 504 to calculate the exponentials of the absolute values based on the preconfigured power constants as described above. The example hardware implementation of FIG. 5 includes a first sign calculator 506 to assign the correct sign to the exponential calculations and a second sign calculator 508 to assign the correct sign for an integral calculator 510 that functions as an accumulator to analyze Equation 17 as described above.

In some examples, the control law analyzer 406 uses a fixed-point representation for data. In such examples, the number of fractional part bits corresponds to the number of clock cycles for the control law analyzer 406 to generate the output control variable ($u_A$).

As shown in FIG. 5, the example hardware implementation of FIG. 5 includes an additional input labelled with a "B." The B input shown in FIG. 5 corresponds the placeholder variable, B[n], in Equation 16 to account for gravity in the z direction. As described above, the value for the B input is set to 0 for the x, y, $\psi$, $\theta$, and $\phi$ parameters and set to gravitational acceleration for the z parameter. Thus, in some examples, the B input may be omitted for the nonlinear control modules 306, 308, 312, 314, 316 associated with the x, y, $\psi$, $\theta$, and $\phi$ parameters and hardcoded for the nonlinear control module 310 associated with the z parameters. However, the B input is included in FIG. 5 to serve as a generic control law calculator 406 that may be used to implement any one of the nonlinear control modules 306, 308, 310, 312, 314, 316 of FIG. 3. In some examples, more than one of the nonlinear control modules 306, 308, 310, 312, 314, 316 may be implemented by a single hardware architecture to reduce the number of components and/or the corresponding footprint of the hardware. However, for increased performance speeds, each of the nonlinear control modules 306, 308, 310, 312, 314, 316 may be separately implemented with corresponding hardware. In some examples, the position-based nonlinear control modules (e.g., the X, Y, and Z nonlinear control modules 306, 308, 310) perform computations to generate an output at a frequency greater than or equal to 10 Hz. In some examples, the orientation-based nonlinear control modules (e.g., the pitch, roll, and yaw nonlinear control modules 312, 314, 316) perform computations to generate an output at a frequency greater than or equal to 250 Hz. In some examples, the nonlinear control modules 306, 308, 310, 312, 314, 316 perform computations at significantly higher frequencies (e.g., up to 10 kHz).

Figure 6:
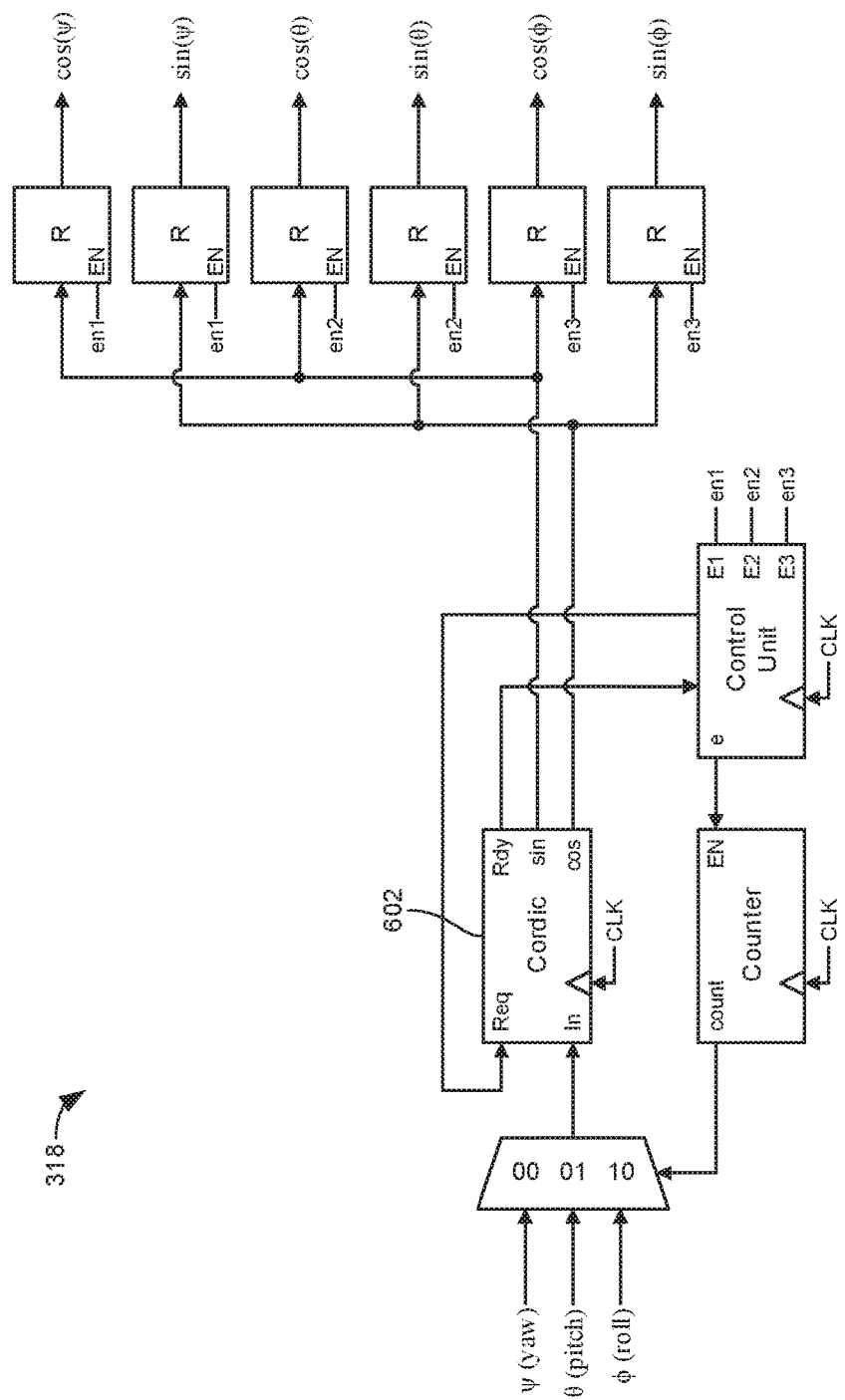
FIG. 6 is a schematic diagram of an example hardware architecture to implement the trig module of FIG. 3.

Returning to FIG. 3, the trajectory tracking controller 102 is provided with the example trig module 318 to calculate trigonometric values 344 associated with the measured orientation information (e.g., the measured pitch orientation (θ), the measured roll orientation (ϕ), and the measured yaw orientation (ψ)). More particularly, as shown in FIG. 3, the trig module 318 calculates the cosine and sine for each of the measured orientations. In some examples, the trig module 318 is implemented via hardware. In particular, FIG. 6 is a schematic diagram of an example hardware architecture to implement the trig module 318 of FIG. 3. As shown in the illustrated example of FIG. 6, the trigonometric values 344 for the measured orientation information 334 are accomplished using a coordinate rotation digital computer (CORDIC) module 602. In some examples, the trig module 318 is constructed so that the yaw trigonometric values 344 for the yaw orientation (ψ) are calculated first (i.e., before the corresponding pitch orientation (θ) or roll orientation (ϕ)). The order of calculations is implemented in this manner because the yaw trigonometric values are needed for subsequent calculations to be performed before the pitch and roll trigonometric values are needed. In the illustrated example, the pitch trigonometric values are calculated before the roll trigonometric values. However, in other examples, the roll trigonometric values may be calculated before the pitch trigonometric values.

In particular, the yaw trigonometric values (output by the trig module 318) are used as inputs to the reference pitch module 322 and the reference roll module 324 that serve to calculate the reference pitch orientation ($\theta_{ref}$) and the reference roll orientation ($\phi_{ref}$). In particular, the reference pitch module 322 and the reference roll module 324, respectively, implement the following equations:

$$\theta_{ref} = \tan^{-1}\left(\frac{u_y \sin(\psi) + u_x \cos(\psi)}{u_z}\right) \quad \text{Eq. 23}$$

$$\phi_{ref} = \sin^{-1}\left(\frac{u_x \sin(\psi) - u_y \cos(\psi)}{\sqrt{u_x^2 + u_y^2 + u_z^2}}\right) \quad \text{Eq. 24}$$

where sin(ψ) and cos(ψ) are the yaw trigonometric values output by the trig module 318, and $u_x$, $u_y$, and $u_z$ are the virtual position control variables 340 output by each of the three position-based nonlinear control modules 306, 308, 310.

In the illustrated example of FIG. 3, the trajectory tracking controller 102 is provided with the example thrust module 320 to calculate a total thrust 346 ($u_T$) for the UAV 100 based on the following equation:

$$u_T = \sqrt{u_x^2 + u_y^2 + u_z^2} \quad \text{Eq. 25}$$

where $u_x$, $u_y$, and $u_z$ are the virtual position control variables 340 output by each of the three position-based nonlinear control modules 306, 308, 310. Equation 25 corresponds to the denominator in the argument for the inverse sine of Equation 24. Thus, in some examples, the reference roll module 324 uses the output of the thrust module 320 to evaluate Equation 24 rather than independently calculating the square root of the sum of the squares as noted above. The total thrust 346 calculated by the thrust module 320 corresponds to the first actual control input (i.e., the translational control input $u_1$) of the control inputs 204 represented in the system of Equation 13. That is, whereas the virtual position control variables 340 output by the position-based nonlinear control modules 306, 308, 310 are based on the model 208 described above (as represented by Equations 16 and 17), the resulting total thrust 346 calculated based on the virtual position control variables 340 corresponds to the translational control input actually used as a control input 204 to calculate the PWM inputs for the motors 104 of UAV 100.

Figure 7:
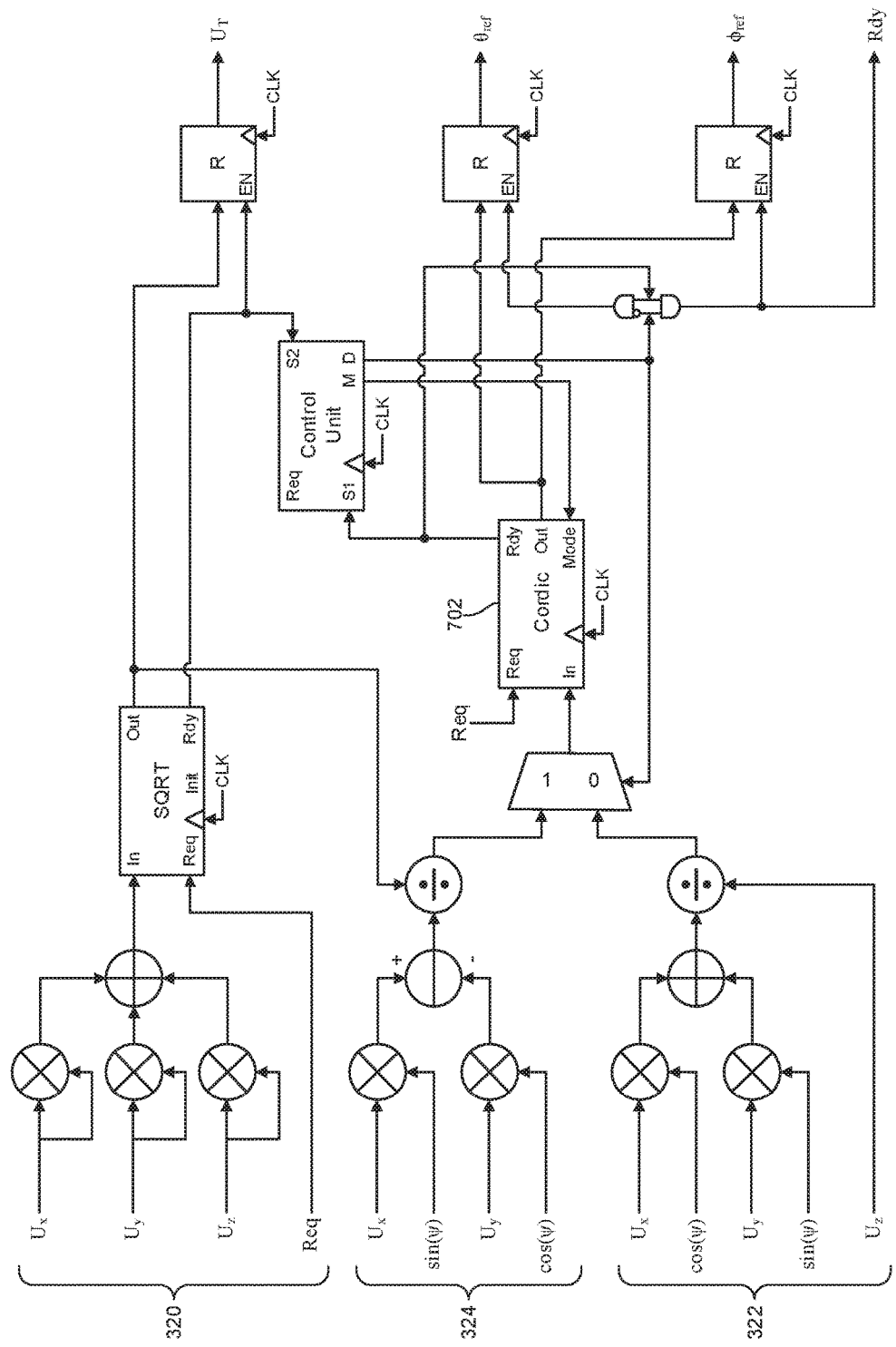
FIG. 7 is a schematic diagram of an example hardware architecture to implement the thrust module, the reference pitch module, and the reference roll module of FIG. 3.

FIG. 7 is a schematic diagram of an example hardware architecture to implement the thrust module 320, the reference pitch module 322, and the reference roll module 324 of FIG. 3. As shown in the illustrated example, the trigonometric functions (e.g., inverse tangent and inverse sine) of both the reference pitch module 322 and the reference roll module 324 are implemented using a single CORDIC module 702. In some such examples, the CORDIC module 702 is used to calculated the reference pitch orientation (the output of the reference pitch module 322) before the reference roll orientation (the output of the reference roll module 324) because the reference pitch orientation calculated can be performed concurrently with the calculations of the total thrust 346 ($u_T$) by the thrust module 320. This ordering of calculation enables the reference roll module 324 to use the calculated total thrust 346 in calculating the reference roll orientation as described above. In other examples, the reference pitch module 322 and the reference roll module 324 may be independently implemented using separate CORDIC modules.

Returning to FIG. 3, the trajectory tracking controller 102 is provided with the example model control module 326 to calculate the remaining actual control inputs 204 (i.e., the orientation control inputs $u_2$, $u_3$, $u_4$). That is, the model control module 326 takes the virtual orientation control variables 342 (e.g., $u_\theta$, $u_\phi$, $u_\psi$) output by the orientation-based nonlinear control modules 312, 314, 316 to calculate the actual control inputs 204 using a non-interacting control for the six equations defining the dynamic of rotational motion (e.g., Equations 7-12) of the model 202 for the UAV 100. More particularly, the example model control module 326 calculates the actual orientation control inputs by implementing the following equations:

$$u_2 = (-I_y + I_z - I_x \cos(\phi))\omega_y\omega_z - \quad \text{Eq. 26}$$
$$(I_x w_y^2 + I_x w_z^2) \cos(\phi) \sin(\phi) + I_x u_\phi - I_x \sin(\theta) u_\psi$$

$$u_3 = ((I_x + I_y - I_z)\cos^2(\phi) + (I_x + I_y - I_z)\sin^2(\phi))\omega_x\omega_z + \quad \text{Eq. 27}$$
$$I_y \cos(\phi) u_\theta + I_y \cos(\theta) \sin(\phi) u_\psi +$$
$$((I_y\omega_z^2\cos^2(\phi) - I_y\omega_y^2\sin^2(\phi)) \cos(\phi) +$$
$$2(I_y\omega_z^2\cos(\phi) + I_y\omega_y^2\sin(\phi))\sin^2(\phi)) \tan(\theta)$$

$$u_4 = ((-I_x + I_y - I_z)\cos^2(\phi) - (I_x + I_y - I_z)\sin^2(\phi))\omega_x\omega_z - \quad \text{Eq. 28}$$
$$I_z\sin(\phi)u_\theta + I_z\cos(\phi)u_\psi + ((-2I_z\omega_y\omega_z\cos(\phi) - 2I_z\omega_y^2)\cos^2(\phi) +$$
$$(I_z\omega_z^2\cos^2(\phi) - I_z\omega_y^2\sin^2(\phi))\sin(\phi)) \tan(\theta)$$

where $I_x$, $I_y$, and $I_z$ are the moments of inertia preconfigured by an operator for the UAV 100, and $\omega_x$, $\omega_y$, and $\omega_z$ are the angular velocities of the UAV 100 as determined by an IMU in association with the orientation sensor(s) 108. As with the other components of the trajectory tracking controller 102, in some examples, the model control module 326 is implemented via hardware (e.g., via a series of multipliers, adders, etc. corresponding to the above equations).

Figure 8:
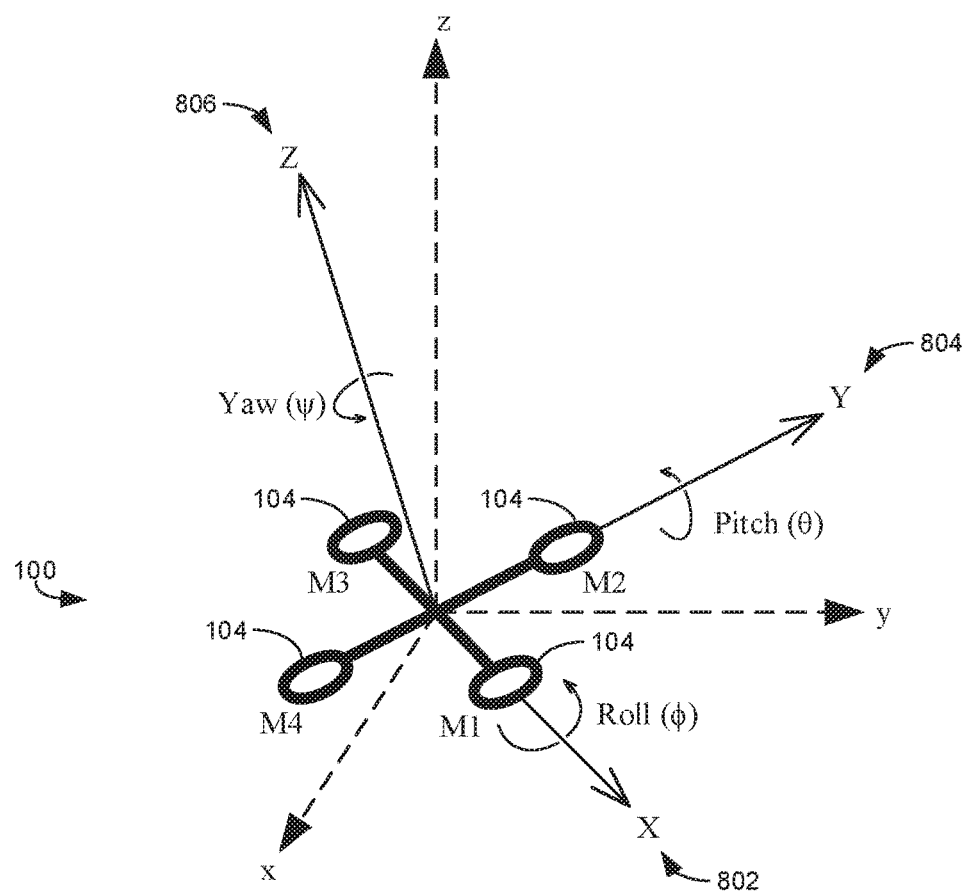
FIG. 8 is a diagram illustrating example X, Y, and Z axes defined for the example UAV of FIG. 1 relative to the four motors of the example UAV.

With all four control inputs 204 determined (e.g., the position control input ($u_1$) calculated by the thrust module 320 and the orientation control inputs ($u_2$, $u_3$, $u_4$) calculated by the model control module 326), the trajectory tracking controller 102 of FIG. 3 is provided with the example PWM module 328 to calculate the PWM inputs 348 for each of the motors 104 of the UAV 100 based on the following equations:

$$PWM_1 = \left(\frac{1}{4c_T}u_1 - \frac{1}{2c_T d}u_3 - \frac{1}{4c_Q}u_4\right)^{1/2} \quad \text{Eq. 29}$$

$$PWM_2 = \left(\frac{1}{4c_T}u_1 - \frac{1}{2c_T d}u_2 + \frac{1}{4c_Q}u_4\right)^{1/2} \quad \text{Eq. 30}$$

$$PWM_3 = \left(\frac{1}{4c_T}u_1 + \frac{1}{2c_T d}u_3 - \frac{1}{4c_Q}u_4\right)^{1/2} \quad \text{Eq. 31}$$

$$PWM_4 = \left(\frac{1}{4c_T}u_1 + \frac{1}{2c_T d}u_2 + \frac{1}{4c_Q}u_4\right)^{1/2} \quad \text{Eq. 32}$$

where $c_T$ is the thrust coefficient for the propellers 106, d is the distance from the center of mass of the UAV 100 to the propellers 106, and $c_Q$ is the drag coefficient for the propellers 106. In some examples, the PWM module 328 is implemented via hardware. Equations 29-32 are based on defining the X, Y, and Z axes 802, 804, 806 of the UAV 100 relative to the four motors 104 as shown in FIG. 8. In particular, the first and third motors 104 (e.g., M1 and M3 in FIG. 8) are aligned with the X-axis 802, while the second and fourth motors 104 (e.g., M2 and M4 in FIG. 8) are aligned with the Y-axis 803. Designating the axes 8022, 804, 806 in this manner results in the first and third PWM inputs (e.g., $PWM_1$ and $PWM_3$) being unaffected by the second orientation control input ($u_2$) while the second and fourth PWM inputs (e.g., $PWM_2$ and $PWM_4$) being unaffected by the second orientation control input ($u_3$) as shown in Equations 29-32.

While the example outlined above is directed towards a four-motor UAV 100 (as shown in FIG. 8), the teachings disclosed herein may be suitably adapted to UAVs (or other devices) with greater or fewer motors. While most of the blocks shown in FIG. 3 would be the same regardless of the number of motors, the PWM module 328 would need to be changed to calculate the PWM inputs 348 corresponding to the number of motors in the system to be controlled. In some examples, the PWM module 328 is omitted from the trajectory tracking controller 102. That is, in some examples, the final outputs of the trajectory tracking controller 102 are the control inputs ($u_1$, $u_2$, $u_3$, $u_4$). In such examples, the function of the PWM module 328 may be implemented by a separate component within the UAV 100 (e.g., a separate hardcoded integrated circuit or a separate processor).

The individual elements of the trajectory tracking controller 102 are constructed with a pipeline architecture so that certain ones of the different calculations by the different elements may be performed concurrently and/or in parallel. Furthermore, the particular order of certain calculations and their scheduling is specifically controlled to improve (e.g., optimize) the overall performance speed of the trajectory tracking controller 102. For example, the trig module 318 may calculate the trigonometric values 344 for the yaw orientation (ψ) before the pitch (θ) or roll (φ) orientations so that the yaw trigonometric values are ready for use by the reference pitch module 322 and the reference roll module 324. Furthermore, the remaining trigonometric values 344 (e.g., for pitch and roll) may be calculated by the trig module 318 while the reference pitch and roll modules 322, 324 are implementing their functionality so that the trigonometric values 344 will all be ready for analysis by the model control module 326.

While an example manner of implementing the trajectory tracking controller 102 of FIG. 1 is illustrated in FIG. 3, one or more of the elements, processes and/or devices illustrated in FIG. 3 may be combined, divided, re-arranged, omitted, eliminated and/or implemented in any other way. Further, the example position module 302, the example orientation module 304, the example X nonlinear control module 306, the example Y nonlinear control module 308, the example Z nonlinear control module 310, the example pitch nonlinear control module 312, the example roll nonlinear control module 314, the example yaw nonlinear control module 316, the example trig module 318, the example thrust module 320, the example reference pitch module 322, the example reference roll module 324, the example model control module 326, the example PWM module 328, and/or, more generally, the example trajectory tracking controller 102 of FIG. 3 may be implemented by hardware, software, firmware and/or any combination of hardware, software and/or firmware. Thus, for example, any of the example position module 302, the example orientation module 304, the example X nonlinear control module 306, the example Y nonlinear control module 308, the example Z nonlinear control module 310, the example pitch nonlinear control module 312, the example roll nonlinear control module 314, the example yaw nonlinear control module 316, the example trig module 318, the example thrust module 320, the example reference pitch module 322, the example reference roll module 324, the example model control module 326, the example PWM module 328, and/or, more generally, the example trajectory tracking controller 102 could be implemented by one or more analog or digital circuit(s), logic circuits, programmable processor(s), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example position module 302, the example orientation module 304, the example X nonlinear control module 306, the example Y nonlinear control module 308, the example Z nonlinear control module 310, the example pitch nonlinear control module 312, the example roll nonlinear control module 314, the example yaw nonlinear control module 316, the example trig module 318, the example thrust module 320, the example reference pitch module 322, the example reference roll module 324, the example model control module 326, and/or the example PWM module 328 is/are hereby expressly defined to include a non-transitory computer readable storage device or storage disk such as a memory, a digital versatile disk (DVD), a compact disk (CD), a Blu-ray disk, etc. including the software and/or firmware. Further still, the example trajectory tracking controller 102 of FIG. 1 may include one or more elements, processes and/or devices in addition to, or instead of, those illustrated in FIG. 3, and/or may include more than one of any or all of the illustrated elements, processes and devices.

Figure 9:
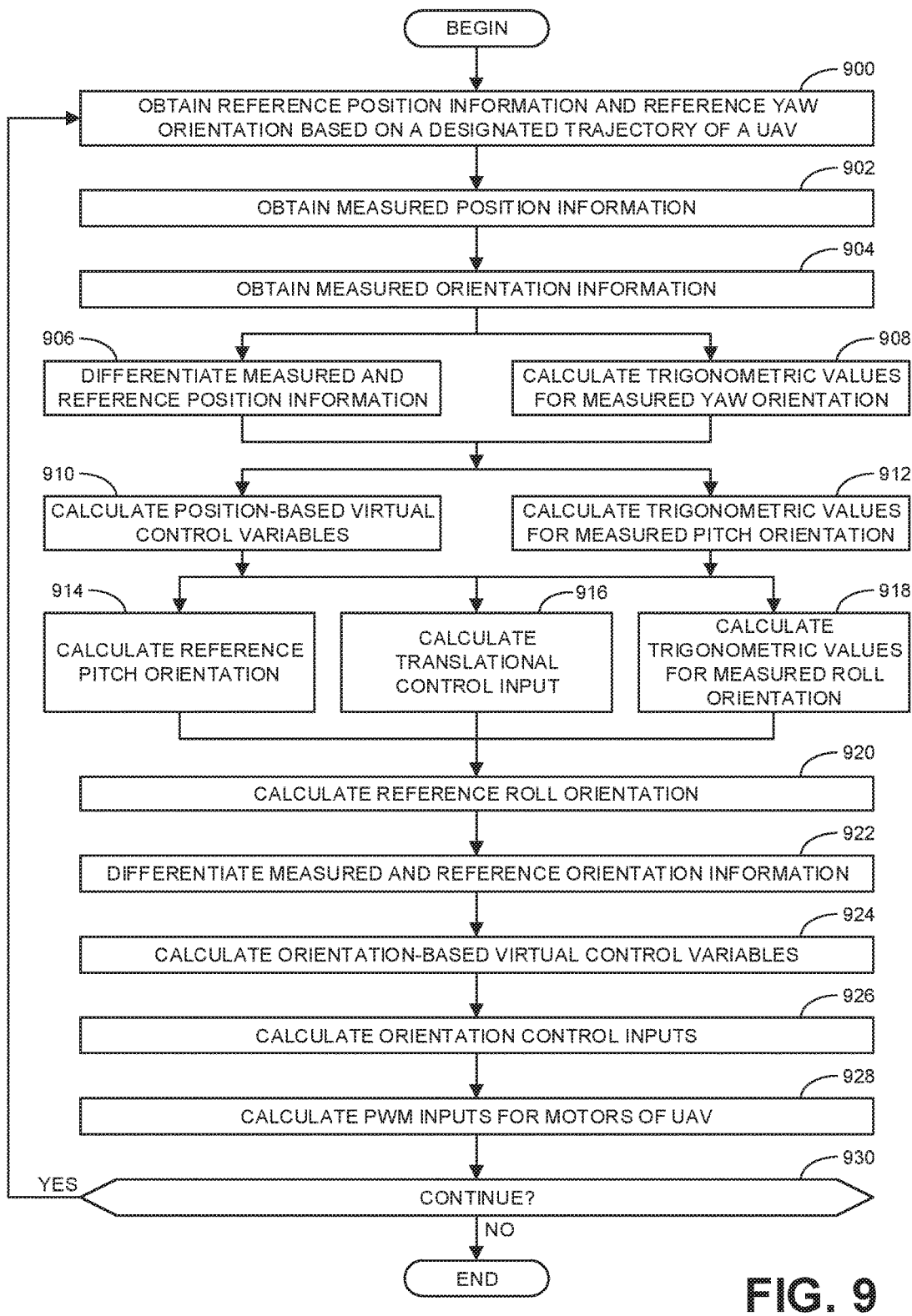
FIG. 9 is a flowchart representative of example machine-readable instructions that may be executed to implement the example trajectory tracking controller of FIGS. 1 and/or 3.

A flowchart representative of example machine readable instructions for implementing the trajectory tracking controller 102 of FIG. 3 is shown in FIG. 9. In this example, the machine readable instructions comprise a program for execution by a processor such as the processor 1012 shown in the example processor platform 1000 discussed below in connection with FIG. 10. The program may be embodied in software stored on a non-transitory computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example trajectory tracking controller 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIG. 9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 9 begins at block 900 where the example trajectory tracking controller 102 obtains reference position information 336 and reference yaw orientation ($\psi_{ref}$) based on a designated trajectory of a UAV (e.g., the UAV 100 of FIG. 1). The reference position information 336 includes a reference X position ($X_{ref}$), a reference Y position ($Y_{ref}$), and a reference Z position ($Z_{ref}$). At block 902, the example position module 302 obtains measured position information 332. The measured position information 332 includes a measured X position, a measured Y position, and a measured Z position. At block 902, the example orientation module 304 obtains measured orientation information. The measured orientation information includes a measured pitch orientation ($\theta$), a measured roll orientation ($\phi$), and a measured yaw orientation ($\psi$).

At block 906, the example position-based nonlinear control modules 306, 308, 310 differentiate the measured and reference position information 332, 336. More particularly, the first-order and second-order differentiators 402, 404 of the nonlinear control modules 306, 308, 310 perform the differentiation calculations. In some examples, each of the position-based nonlinear control modules 306, 308, 310 operates concurrently or in parallel. In other examples, where a single nonlinear control module is being used, the derivatives for the X, Y, and Z position information (e.g., the measured and reference position information 332, 336) are calculated one at a time. Concurrently and/or in parallel with block 906, at block 908, the example trig module 318 calculates trigonometric values 344 for the measured yaw orientation.

At block 910, the example position-based nonlinear control modules 306, 308, 310 calculate the virtual position control variables 340 (e.g., $u_x$, $u_y$, $u_z$). More particularly, the control law analyzer 406 of the nonlinear control modules 306, 308, 310 performs the calculations. In some examples, each of the position-based nonlinear control modules 306, 308, 310 operates concurrently or in parallel. In other examples, where a single nonlinear control module is being used, the virtual position control variables 340 are calculated one at a time. Concurrently and/or in parallel with block 910, at block 912, the example trig module 318 calculates trigonometric values 344 for the measured pitch orientation.

At block 914, the example reference pitch module 322 calculates a reference pitch orientation ($\theta_{ref}$). The reference pitch orientation is calculated based on the virtual position control variables 340 (calculated at block 910) and the yaw trigonometric values (calculated at block 908). Thus, in the example process, the operations of both blocks 908 and 910 are to be completed before block 914. Accordingly, while FIG. 9 shows block 908 being implemented concurrently and/or in parallel with block 906, in other examples, block 908 may be implemented concurrently and/or in parallel with block 910.

Concurrent and/or in parallel with block 914, at block 916, the example thrust module 320 calculated the translational control input ($u_1$). The translational control input is calculated based on the virtual position control variables 340. As such, the implementation of block 916 is scheduled to occur after the completion of block 910. As described above, the translational control input corresponds to the total thrust 346 ($u_T$) for the UAV 100. Also concurrent and/or in parallel with block 914, at block 918, the example trig module 318 calculates trigonometric values 344 for the measured roll orientation.

At block 920, the example reference roll module 324 calculates a reference roll orientation ($\phi_{ref}$). In the illustrated example, the implementation of block 920 is scheduled to occur after completion of block 916 because the reference roll orientation is calculated based on translational control input calculated at block 916.

Once the reference roll orientation is calculated (block 920), control advances to block 922 where the example orientation-based nonlinear control modules 312, 314, 316 differentiate the measured and reference orientation information. Thereafter, at block 924, the example orientation-based nonlinear control modules 312, 314, 316 calculate the virtual orientation control variables 342 (e.g., $u_\theta$, $u_\phi$, $u_\psi$). In some examples, the implementation of the orientation-based nonlinear control modules 312, 314, 316 at blocks 922 and 924 is the same as described above with respect to the position-based nonlinear control modules 306, 308, 310 at blocks 906 and 908. In some examples, a single nonlinear control module is used to implement all of blocks 906, 908, 922, and 924.

At block 926, the example model control module 326 calculates the orientation control inputs ($u_2$, $u_3$, $u_4$). The orientation control inputs are calculated based on the virtual orientation control variables 342 (calculated at block 924) and the trigonometric values 344 for the pitch and roll (calculated at blocks 912 and 918). The implementation of block 926 is the first time when the pitch and roll trigonometric values are needed in the example process. Accordingly, while the implementation of blocks 912 and 918 are shown as occurring concurrently with blocks 910 and 914 respectively, blocks 912 and 918 may be implemented concurrently and/or in parallel with any of blocks 910, 914, 916, 920, 922, and 924. Furthermore, while the example process of FIG. 9 shows the trigonometric values 344 for the pitch orientation being calculated before the roll orientation, in other examples, the trigonometric values 344 for the roll orientation may be calculated first.

At block 928, the example PWM module 328 calculates PWM inputs 348 for the motors 104 of the UAV 100. At block 930, the example trajectory tracking controller 102 determines whether to continue. If so, control returns to block 900. Otherwise, the example process of FIG. 9 ends.

Figure 10:
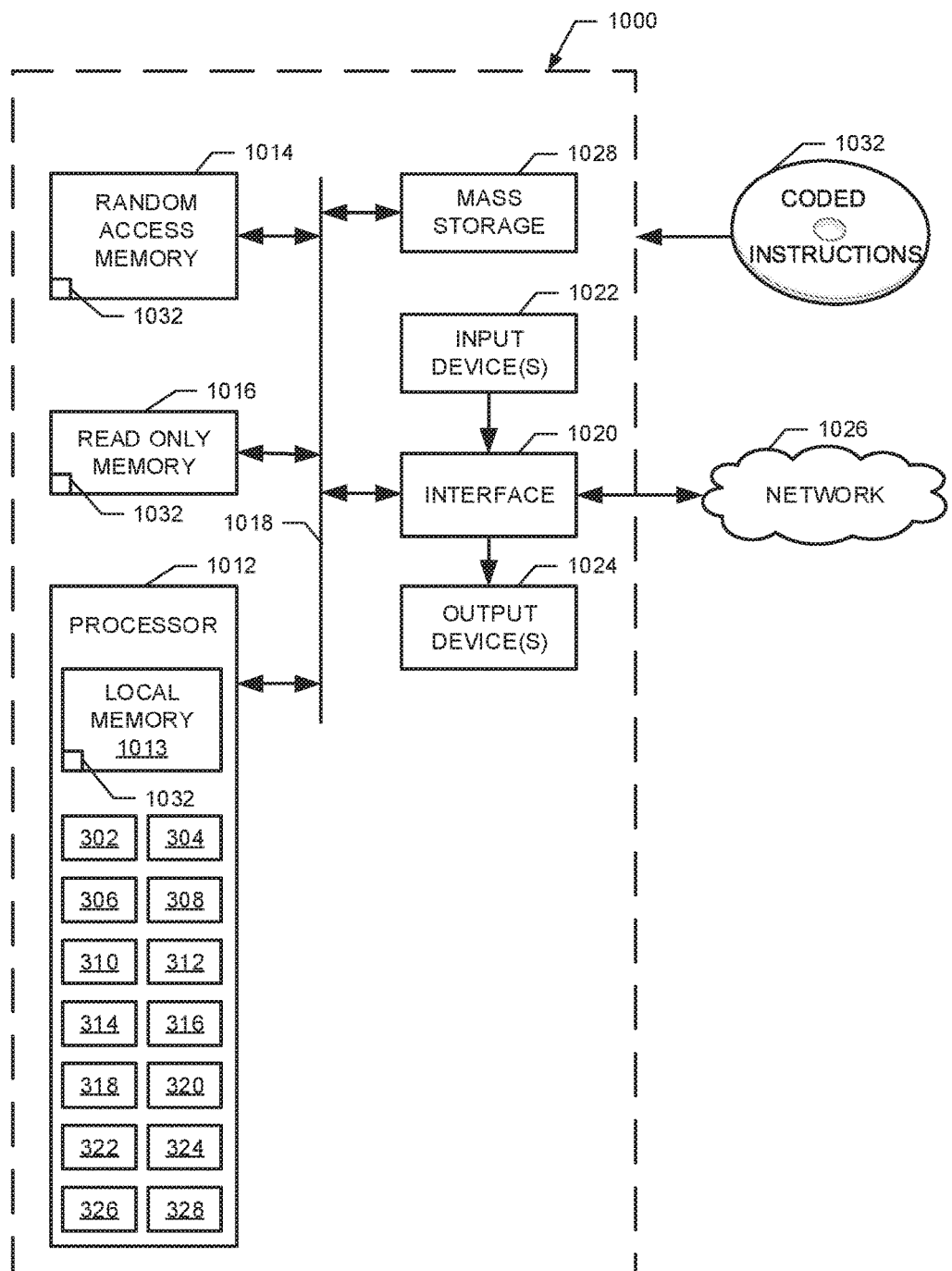
FIG. 10 is a block diagram of an example processor platform structured to execute the example machine-readable instructions of FIG. 9 to implement the example trajectory tracking controller of FIGS. 1 and/or 3.

FIG. 10 is a block diagram of an example processor platform 1000 capable of executing the instructions of FIG. 9 to implement the trajectory tracking controller 102 of FIG. 3. The processor platform 1000 can be, for example, a server, a personal computer, a mobile device (e.g., a cell phone, a smart phone, a tablet such as an iPad™), a personal digital assistant (PDA), or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor may be a semiconductor based (e.g., silicon based) device. In this example, the processor implements the example position module 302, the example orientation module 304, the example X nonlinear control module 306, the example Y nonlinear control module 308, the example Z nonlinear control module 310, the example pitch nonlinear control module 312, the example roll nonlinear control module 314, the example yaw nonlinear control module 316, the example trig module 318, the example thrust module 320, the example reference pitch module 322, the example reference roll module 324, the example model control module 326, and the example PWM module 328.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIG. 9 may be stored in the mass storage device 1028, in the volatile memory 1014, in the non-volatile memory 1016, and/or on a removable tangible computer readable storage medium such as a CD or DVD.

From the foregoing, it will be appreciated that example methods, apparatus and articles of manufacture have been disclosed that enable the autonomous control of both the attitude and the navigation of a UAV through robust and accurate trajectory tracking. This is made possible based on the implementation of a nonlinear control system that takes into account a model of the movement of the UAV. The model is based on general dynamics such that the examples may easily be configured to many different types of UAVs. Furthermore, some disclosed examples are implemented in dedicated hardware (e.g., a hardcoded integrated circuit) that operates independent of and/or in parallel with a general-purpose processor to achieve increased computational speeds needed for accurate trajectory tracking. Furthermore, the pipeline architecture of the hardware as well as the associated scheduling of computations serves to increase (e.g., optimize) the overall computational speed of the disclosed examples by enabling different calculations to be performed in parallel.

Example 1 is an apparatus that includes a logic circuit configured to calculate virtual position control variables for a vehicle moved using multiple motors. The virtual position control variables are calculated based on an application of a control law to position information of the vehicle. The control law derived from a nonlinear model of movement of the vehicle. The logic circuit is further to calculate control inputs based on the virtual position control variables. The control inputs are to control the motors to navigate the vehicle along a designated path of movement.

Example 2 includes the subject matter of Example 1, wherein the position information includes reference position information and measured position information. The logic circuit is configured further to calculate reference orientation information based on the virtual position control variables. The reference orientation information and the reference position information correspond to the designated path of movement for the vehicle.

Example 3 includes the subject matter of Example 2, wherein the logic circuit is configured further to calculate trigonometric values for measured orientation information. The measured orientation information includes a measured yaw orientation, a measured pitch orientation, and a measured roll orientation. The reference orientation information is calculated based on the measured yaw orientation.

Example 4 includes the subject matter of Example 3, wherein the trigonometric values for the measured yaw orientation are calculated prior to the trigonometric values for the measured pitch orientation and the measured roll orientation. The trigonometric values for the measured yaw orientation calculated in parallel with the virtual position control variables.

Example 5 includes the subject matter of anyone of Examples 3 or 4, wherein the trigonometric values for at least one of the measured pitch orientation or the measured roll orientation are calculated in parallel with calculations of the reference orientation information.

Example 6 includes the subject matter of anyone of Examples 2-4, wherein the logic circuit is configured further to calculate a total thrust for the vehicle based on the virtual position control variables. The total thrust corresponds to a first one of the control inputs.

Example 7 includes the subject matter of Example 6, wherein the reference orientation information includes a reference pitch orientation and a reference roll orientation. The reference roll orientation is calculated using the total thrust.

Example 8 includes the subject matter of Example 7, wherein the reference pitch orientation is calculated before the reference roll orientation. The reference pitch orientation is calculated in parallel with calculation of the total thrust.

Example 9 includes the subject matter of anyone of Examples 2-8, wherein the logic circuit is configured further to calculate virtual orientation control variables for the vehicle based on an application of the control law to the reference orientation information and measured orientation information.

Example 10 includes the subject matter of Example 9, wherein the virtual position control variables are calculated using a first hardware architecture independent of a general-purpose processor. The virtual orientation control variables are calculated via a second hardware architecture independent of the general-purpose processor. The first hardware architecture has a same architecture as the second hardware architecture.

Example 11 includes the subject matter of anyone of Examples 1-10, wherein the logic circuit is configured further to generate pulse-width modulated inputs to control the motors of the vehicle based on the control inputs.

Example 12 includes the subject matter of anyone of Examples 1-10, wherein the vehicle is an unmanned aerial vehicle and the designated path of movement is a trajectory for the unmanned aerial vehicle.

Example 13 is a non-transitory computer readable medium comprising instructions that, when executed, cause a machine to at least calculate virtual position control variables for a vehicle moved using multiple motors. The virtual position control variables are calculated based on an application of a control law to position information of the vehicle. The control law is derived from a nonlinear model of movement of the vehicle. The instructions further cause the machine to calculate control inputs based on the virtual position control variables. The control inputs to control the motors to navigate the vehicle along a designated path of movement.

Example 14 includes the subject matter of Example 13, wherein the position information includes reference position information and measured position information. The instructions to further cause the machine to calculate reference orientation information based on the virtual position control variables. The reference orientation information and the reference position information correspond to the designated path of movement for the vehicle.

Example 15 includes the subject matter of Example 14, wherein the instructions further cause the machine to calculate trigonometric values for measured orientation information. The measured orientation information includes a measured yaw orientation, a measured pitch orientation, and a measured roll orientation. The reference orientation information is calculated based on the measured yaw orientation.

Example 16 includes the subject matter of Example 15, wherein the trigonometric values for the measured yaw orientation are calculated prior to the trigonometric values for the measured pitch orientation and the measured roll orientation. The trigonometric values for the measured yaw orientation are calculated in parallel with the virtual position control variables.

Example 17 includes the subject matter of anyone of Examples 15 or 16, wherein the trigonometric values for at least one of the measured pitch orientation or the measured roll orientation are calculated in parallel with calculations of the reference orientation information.

Example 18 includes the subject matter of anyone of Examples 14-17, wherein the instructions further cause the machine to calculate a total thrust for the vehicle based on the virtual position control variables. The total thrust corresponds to a first one of the control inputs.

Example 19 includes the subject matter of Example 18, wherein the reference orientation information includes a reference pitch orientation and a reference roll orientation. The reference roll orientation is calculated using the total thrust.

Example 20 includes the subject matter of Example 19, wherein the reference pitch orientation is calculated before the reference roll orientation. The reference pitch orientation is calculated in parallel with calculation of the total thrust.

Example 21 includes the subject matter of anyone of Examples 14-20, wherein the instructions further cause the machine to calculate virtual orientation control variables for the vehicle based on an application of the control law to the reference orientation information and measured orientation information.

Example 22 includes the subject matter of anyone of Examples 13-22, wherein the instructions further cause the machine to generate pulse-width modulated inputs to control the motors of the vehicle based on the control inputs.

Example 23 includes the subject matter of anyone of Examples 13-23, wherein the vehicle is an unmanned aerial vehicle and the designated path of movement is a trajectory for the unmanned aerial vehicle.

Example 24 is a method that includes calculating virtual position control variables for a vehicle moved using multiple motors. The virtual position control variables are calculated based on an application of a control law to position information of the vehicle. The control law is derived from a nonlinear model of movement of the vehicle. The method further includes calculating control inputs based on the virtual position control variables. The control inputs are to control the motors to navigate the vehicle along a designated path of movement.

Example 25 includes the subject matter of Example 24, wherein the position information includes reference position information and measured position information. The method further includes calculating reference orientation information based on the virtual position control variables. The reference orientation information and the reference position information correspond to the designated path of movement for the vehicle.

Example 26 includes the subject matter of Example 25, further including calculating trigonometric values for measured orientation information. The measured orientation information includes a measured yaw orientation, a measured pitch orientation, and a measured roll orientation. The reference orientation information is calculated based on the measured yaw orientation.

Example 27 includes the subject matter of Example 26, wherein the trigonometric values for the measured yaw orientation are calculated prior to the trigonometric values for the measured pitch orientation and the measured roll orientation. The trigonometric values for the measured yaw orientation are calculated in parallel with the virtual position control variables.

Example 28 includes the subject matter of anyone of Examples 26 or 27, wherein the trigonometric values for at least one of the measured pitch orientation or the measured roll orientation are calculated in parallel with calculations of the reference orientation information.

Example 29 includes the subject matter of anyone of Examples 25-28, further including calculating a total thrust for the vehicle based on the virtual position control variables. The total thrust corresponds to a first one of the control inputs.

Example 30 includes the subject matter of Example 29, wherein the reference orientation information includes a reference pitch orientation and a reference roll orientation. The reference roll orientation is calculated using the total thrust.

Example 31 includes the subject matter of Example 30, wherein the reference pitch orientation is calculated before the reference roll orientation. The reference pitch orientation is calculated in parallel with calculation of the total thrust.

Example 32 includes the subject matter of anyone of Examples 25-31, further including calculating virtual orientation control variables for the vehicle based on an application of the control law to the reference orientation information and measured orientation information.

Example 33 includes the subject matter of Example 32, wherein the virtual position control variables are calculated using a first hardcoded logic circuit independent of a general-purpose processor. The virtual orientation control variables are calculated via a second hardcoded logic circuit independent of the general-purpose processor. The first hardcoded logic circuit has a same architecture as the second hardcoded logic circuit.

Example 34 includes the subject matter of anyone of Examples 24-33, further including generating pulse-width modulated inputs to control the motors of the vehicle based on the control inputs.

Example 35 includes the subject matter of anyone of Examples 24-34, wherein the vehicle is an unmanned aerial vehicle and the designated path of movement is a trajectory for the unmanned aerial vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising a logic circuit configured to:
    calculate virtual position control variables for a vehicle moved using multiple motors, the virtual position control variables calculated based on an application of a control law to position information of the vehicle, the control law derived from a nonlinear model of movement of the vehicle; and
    calculate control inputs based on the virtual position control variables, the control inputs to control the motors to navigate the vehicle along a designated path of movement.

2. The apparatus of claim 1, wherein the position information includes reference position information and measured position information, the logic circuit configured further to calculate reference orientation information based on the virtual position control variables, the reference orientation information and the reference position information corresponding to the designated path of movement for the vehicle.

3. The apparatus of claim 2, wherein the logic circuit is configured further to calculate trigonometric values for measured orientation information, the measured orientation information including a measured yaw orientation, a measured pitch orientation, and a measured roll orientation, the reference orientation information calculated based on the measured yaw orientation.

4. The apparatus of claim 3, wherein the trigonometric values for the measured yaw orientation are calculated prior to the trigonometric values for the measured pitch orientation and the measured roll orientation, the trigonometric values for the measured yaw orientation calculated in parallel with the virtual position control variables.

5. The apparatus of claim 3, wherein the trigonometric values for at least one of the measured pitch orientation or the measured roll orientation are calculated in parallel with calculations of the reference orientation information.

6. The apparatus of claim 2, wherein the logic circuit is configured further to calculate a total thrust for the vehicle based on the virtual position control variables, the total thrust corresponding to a first one of the control inputs.

7. The apparatus of claim 6, wherein the reference orientation information includes a reference pitch orientation and a reference roll orientation, the reference roll orientation calculated using the total thrust.

8. The apparatus of claim 7, wherein the reference pitch orientation is calculated before the reference roll orientation, the reference pitch orientation calculated in parallel with calculation of the total thrust.

9. The apparatus of claim 2, wherein the logic circuit is configured further to calculate virtual orientation control variables for the vehicle based on an application of the control law to the reference orientation information and measured orientation information.

10. The apparatus of claim 9, wherein the virtual position control variables are calculated using a first hardware architecture independent of a general-purpose processor, the virtual orientation control variables calculated via a second hardware architecture independent of the general-purpose processor, the first hardware architecture having a same architecture as the second hardware architecture.

11. The apparatus of claim 1, wherein the logic circuit is configured further to generate pulse-width modulated inputs to control the motors of the vehicle based on the control inputs.

12. The apparatus of claim 1, wherein the vehicle is an unmanned aerial vehicle and the designated path of movement is a trajectory for the unmanned aerial vehicle.

13. A non-transitory computer readable medium comprising instructions that, when executed, cause a machine to at least:
calculate virtual position control variables for a vehicle moved using multiple motors, the virtual position control variables calculated based on an application of a control law to position information of the vehicle, the control law derived from a nonlinear model of movement of the vehicle; and
calculate control inputs based on the virtual position control variables, the control inputs to control the motors to navigate the vehicle along a designated path of movement.

14. The non-transitory computer readable medium of claim 13, wherein the position information includes reference position information and measured position information, the instructions to further cause the machine to calculate reference orientation information based on the virtual position control variables, the reference orientation information and the reference position information corresponding to the designated path of movement for the vehicle.

15. The non-transitory computer readable medium of claim 14, wherein the instructions further cause the machine to calculate trigonometric values for measured orientation information, the measured orientation information including a measured yaw orientation, a measured pitch orientation, and a measured roll orientation, the reference orientation information calculated based on the measured yaw orientation.

16. The non-transitory computer readable medium of claim 15, wherein the trigonometric values for the measured yaw orientation are calculated prior to the trigonometric values for the measured pitch orientation and the measured roll orientation, the trigonometric values for the measured yaw orientation calculated in parallel with the virtual position control variables.

17. A method comprising:
calculating virtual position control variables for a vehicle moved using multiple motors, the virtual position control variables calculated based on an application of a control law to position information of the vehicle, the control law derived from a nonlinear model of movement of the vehicle; and
calculating control inputs based on the virtual position control variables, the control inputs to control the motors to navigate the vehicle along a designated path of movement.

18. The method of claim 17, wherein the position information includes reference position information and measured position information, the method further including calculating reference orientation information based on the virtual position control variables, the reference orientation information and the reference position information corresponding to the designated path of movement for the vehicle.

19. The method of claim 18, further including calculating trigonometric values for measured orientation information, the measured orientation information including a measured yaw orientation, a measured pitch orientation, and a measured roll orientation, the reference orientation information calculated based on the measured yaw orientation.

20. The method of claim 19, wherein the trigonometric values for the measured yaw orientation are calculated prior to the trigonometric values for the measured pitch orientation and the measured roll orientation, the trigonometric values for the measured yaw orientation calculated in parallel with the virtual position control variables.

21. The method of claim 18, further including calculating a total thrust for the vehicle based on the virtual position control variables, the total thrust corresponding to a first one of the control inputs.

22. The method of claim 18, further including calculating virtual orientation control variables for the vehicle based on an application of the control law to the reference orientation information and measured orientation information.

* * * * *